United States Patent [19]

Simmons

[11] 4,288,009
[45] Sep. 8, 1981

[54] LIQUID MEASURING DEVICE

[76] Inventor: Graham M. A. Simmons, 22, Chalfont Rd., Seer Green, Buckinghamshire, England

[21] Appl. No.: 131,401

[22] Filed: Mar. 18, 1980

[51] Int. Cl.³ .............................................. G01F 11/16
[52] U.S. Cl. .................................. 222/442; 222/447; 222/449; 141/362
[58] Field of Search ............... 222/442, 447, 445, 449, 222/453; 141/362

[56] References Cited

U.S. PATENT DOCUMENTS

| 2,620,113 | 12/1952 | Bodendderfer et al. | 222/453 X |
| 2,703,666 | 3/1955 | Iannelli | 222/447 |
| 2,864,538 | 12/1958 | Rasmussen | 222/453 |

Primary Examiner—Charles A. Marmor
Attorney, Agent, or Firm—Shapiro and Shapiro

[57] ABSTRACT

A liquid measuring and dispensing device comprises: a flow tube providing an inflow duct and an outflow duct; an upper valve seat provided at the lower end of the inflow duct; a lower valve seat provided at the upper end of the outflow duct; a measuring chamber axially slidable relative to the flow tube; and a valve carrier connected to the measuring chamber for movement therewith; an upper valve member and a lower valve member carried by the valve carrier; the measuring chamber being movable between an upper and a lower position through an intermediate position; in the lower position of the chamber, the lower valve member seating on the lower valve seat to close communication between the chamber and the upper end of the outflow duct but the upper valve member being unseated from the lower end of the inflow duct to provide communication between the inflow duct and the chamber; in the upper position of the chamber the upper valve member seats on the upper valve seat closing communication between the inflow duct and the chamber but the lower valve member is unseated from the lower valve seat to provide communication between the chamber and the outflow duct; in the intermediate position of the chamber, both valve members seat on the respective valve seats to close communication between the chamber and both the inflow and outflow ducts; and wherein the chamber remains in communication with the portion of the flow tube between the valve seats.

4 Claims, 5 Drawing Figures

LIQUID MEASURING DEVICE

FIELD OF THE INVENTION

The present invention relates to liquid measuring devices, principally but not exclusively for dispensing measured quantities of liquid from upturned bottles to which they are connected. Devices of this type are commonly employed in serving drinks in bars.

BACKGROUND OF THE INVENTION

A known liquid measuring and dispensing device comprises a flow tube providing inflow and outflow ducts, the inflow duct having an inflow part in the tube sidewall, a measuring chamber embracing the flow tube and having a cylindrical inside wall member axially slidable along the outer surface of the flow tube and provided with liquid seals adjacent its ends, and upper and lower further ports in the chamber inside wall. Means are provided in the tube to prevent direct flow of liquid through the tube between the inflow and outflow ducts. The chamber is slideable between an upper position and a lower position. In the lower position, the upper further port is in the register with the inflow port and the lower further port is out of register with the inflow port whereby the chamber can be filled from the inflow duct. In the upper position, the upper further port is out of register with the inflow port and the lower further port is in register with the inflow duct whereby the chamber can be discharged to the inflow duct. At an intermediate position the upper and lower further ports are out of register with the inflow port and the outflow port respectively.

The means to prevent direct flow between the inflow and outflow ducts may be a plug located in the tube. In the lower position of the chamber, leakage may occur from the chamber through the lower further port, between the chamber inside wall and the tube sidewall, through the outflow port and into the outflow duct. Similarly in the upper position, leakage may occur from the inflow duct, through the upper further port, between the chamber inside wall and the tube sidewall, through the outflow port into the outflow duct.

To obviate such leakage, the means preventing direct flow of liquid through the tube between the inflow and outflow ports may comprise reciprocable valve members, upper and lower valve seats being provided respectively at the upper end of the outflow duct and the lower end of the inflow duct. The valve members are carried by a valve carrier which is connected to the chamber for movement therewith. A coil spring accommodated in the valve carrier biases the valve members apart. In the lower position of the chamber, the valve member is unseated from the upper valve seat but the lower valve member seats on the lower valve seat to prevent leakage into the outflow duct. In the upper position the lower valve member is unseated from the upper valve seat but the upper valve member seats on the upper valve seat to prevent leakage from the inflow duct.

The presence of the ports is disadvantageous because the ports are not conducive to good flow of air or liquids. This is because:

(a) The valves open before the ports are fully in register thereby partly obstructing flow;
(b) The escape of air bubbles from the top of the chamber is difficult since they excape via the ports which are approximately one third of the tube surface diameter;
(c) The inflow of liquid into the chamber and escape of air from the chamber are confused because they both occur simultaneously using the same port which has only a small aperture, and air as small bubbles is present in the bottle and measuring device during rapid operation.
(d) There is a tendency for air to remain locked, after filling, at the top of the chamber. This can lead to inaccurate measure.
(e) If, as commonly occurs, the measuring device is fixed out of the vertical, there is a residue of liquid left at the bottom of the chamber and radially opposite the ports after draining, causing variation in measure.
(f) The ports cause problems when handling liquids more viscous than drinkable distilled alcohols.

Also the engaging surfaces of the valve members and valve seats are flat and normal to the direction of movement of the valves i.e. the longitudinal direction of the flow tube. Thus the force which either valve member can exert on the corresponding valve seat is limited to the force exerted by the coil spring urging the valve members apart. Consequently the sealing contact between either valve member and the corresponding valve seat is limited in its effectiveness and leakage as described above may still occur.

DESCRIPTION OF THE INVENTION

The present invention aims to overcome or mitigate the disadvantages set out above.

In accordance with the present invention, there is provided a liquid measuring and dispensing device comprising: a flow tube providing an inflow duct and an outflow duct; an upper valve seat provided at the lower end of the inflow duct; a lower valve seat provided at the upper end of the outflow duct; a measuring chamber axially slidable relative to the flow tube; and a valve carrier connected to the measuring chamber for movement therewith; an upper valve member and a lower valve member carried by the valve carrier; the measuring chamber being movable between an upper and a lower position through an intermediate position; in the lower position of the chamber, the lower valve member seating on the lower valve seat to close communication between the chamber and the upper end of the outflow duct but the upper valve member being unseated from the lower end of the inflow duct to provide communication between the inflow duct and the chamber; in the upper position of the chamber the upper valve member seats on the upper valve seat closing communication between the inflow duct and the chamber but the lower valve member is unseated from the lower valve seat to provide communication between the chamber and the outflow duct; in the intermediate position of the chamber, both valve members seat on the respective valve seats to close communication between the chamber and both the inflow and outflow ducts; and throughout movement of the chamber between its upper and lower positions, the chamber remains in communication with the portion of the flow tube between the valve seats.

Preferably, to enhance sealing engagement between each valve member and the corresponding valve seat when the valve is seated thereon, each valve member exerts a sealing force on the valve seat, the sealing force having a component normal to the direction of movement of the valve member. This may be achieved by providing each valve member and corresponding valve seat with frustoconical sealing surfaces.

It is preferred that the top of the measuring cylinder is vented to the atmosphere when the measuring chamber is moved to its upper position.

Thus the valve member serve not merely to prevent leakage but to control the inflow and outflow of liquid from the measuring chamber. Thus ports are not necessary and the disadvantages associated with ports are eliminated.

BRIEF DESCRIPTION OF THE DRAWINGS

The invention is further described below by way of example with reference to the accompanying drawings, wherein.

DESCRIPTION OF A PREFERRED EMBODIMENT

Figure 1:
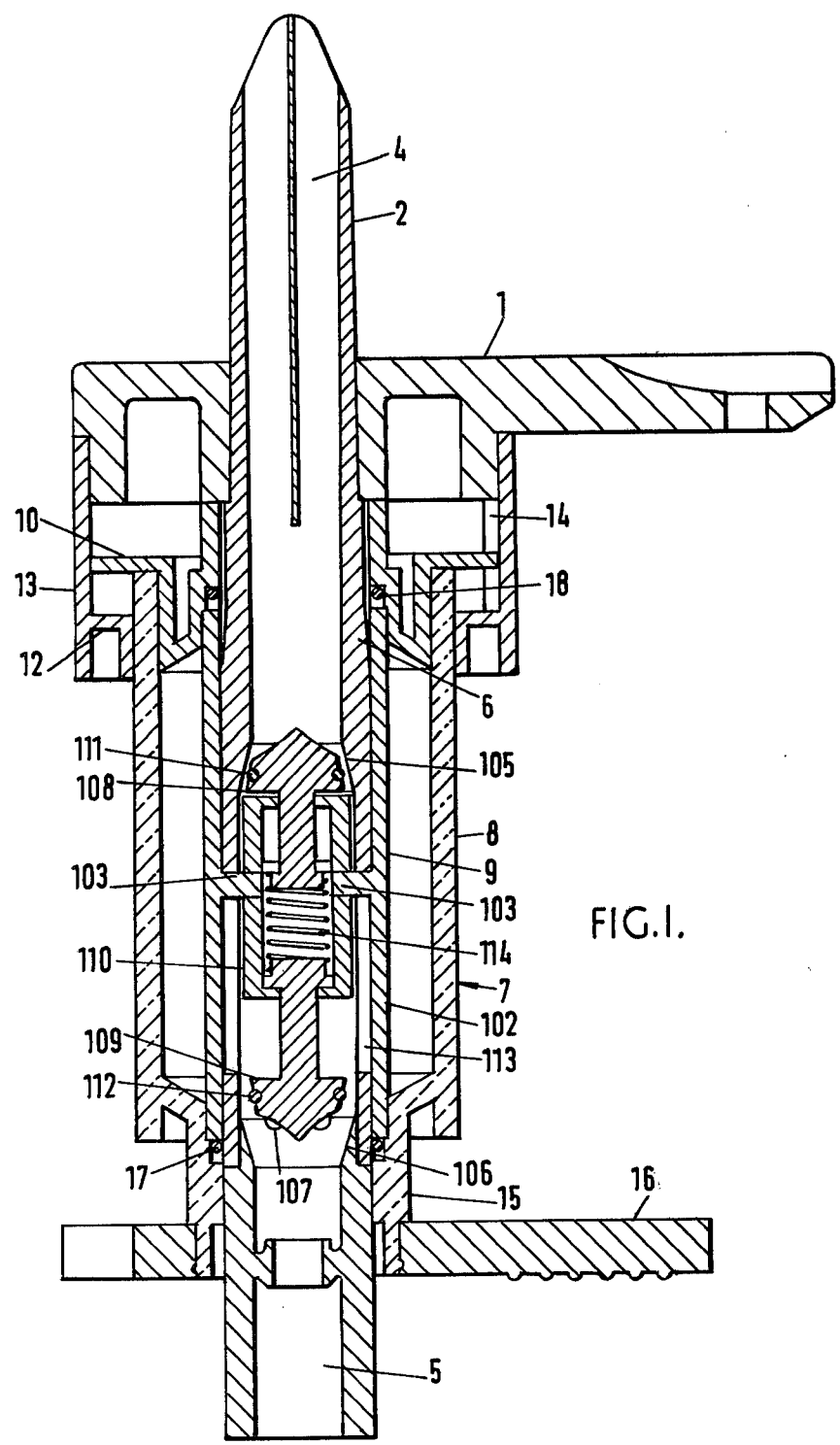
FIG. 1 shows a vertical section through a device according to the invention with its measuring cylinder in its upper, emptying position.
Figure 2:
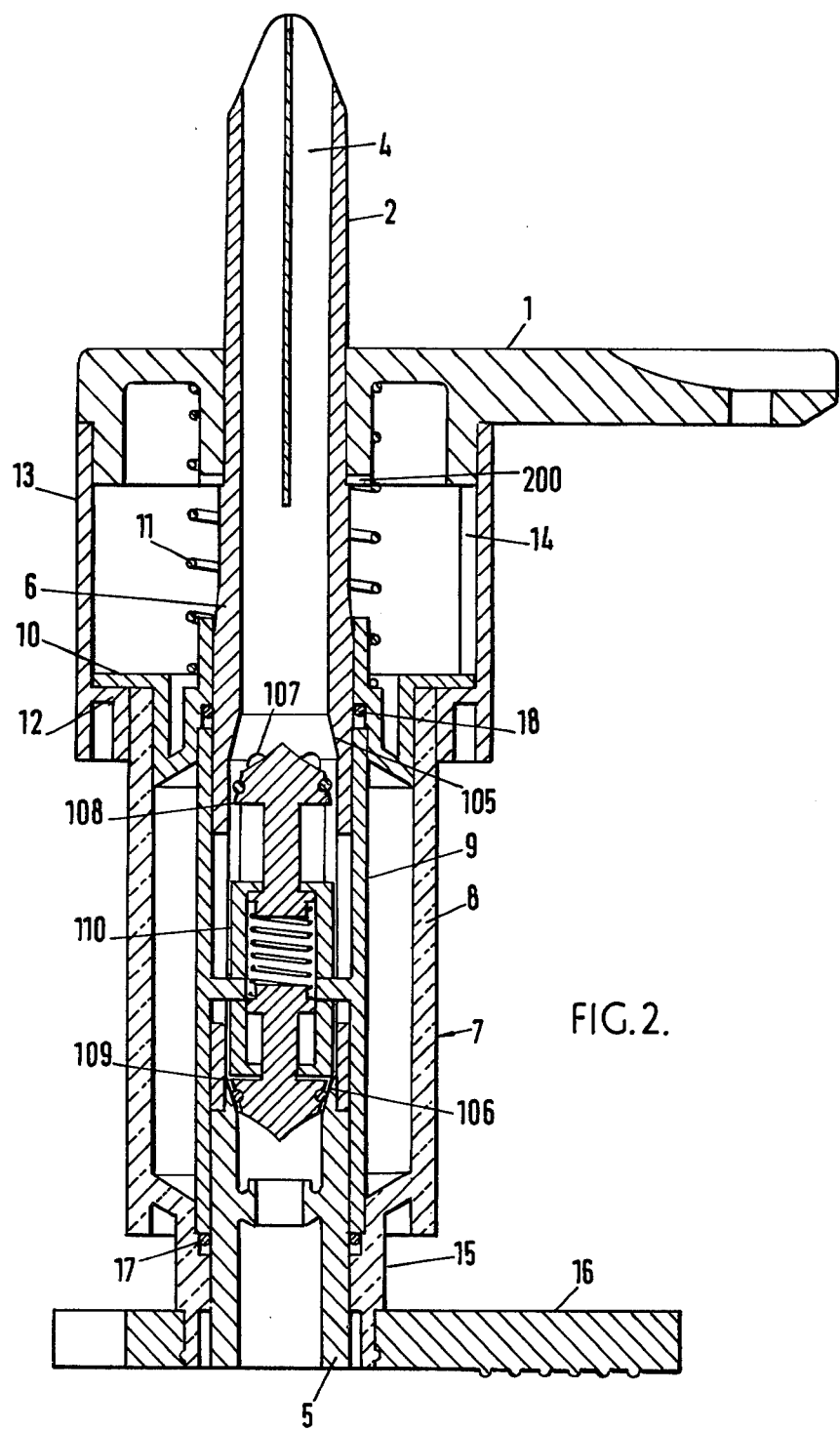
FIG. 2 is similar to FIG. 1 but shows the measuring cylinder in its lower, filling position.

Referring to FIGS. 1 and 2, a device for dispensing liquid from an upturned bottle comprises a support plate 1 which is attached to a shelf, stand or other fixture (not shown) and to which a flow tube 2 is fixed so that its axis is vertical.

The upper part of the tube 2 forms an inflow duct 4 and the lower part forms an outflow duct 5. The top end of the tube is joined to means (not shown) to form a releasable liquid-tight connection with the mouth of an upturned bottle mounted above the device and from which liquid is to be dispensed. Over a substantial part of its length the outside diameter of the inflow duct part of the tube is reduced, the reduced part merging into the remaining part of the tube at 6.

The tube is embraced by a cylindrical measuring chamber 7. The chamber 7 has a transparent outer wall 8, an inner member 9, which closely fits the tube, and a closure 10 at its top end which forms a seating for a compression coil spring 11 (not shown in FIG. 1 for the sake of clarity) encircling the tube 2 and abutting the underside of the plate 1 to urge the chamber downwardly. The chamber is freely slidable along the tube 2 between upper and lower positions shown respectively in FIGS. 1 and 2 and is retained in its lower position by abutment of the closure 10 against an internal flange 12 of a cylindrical outer cover 13 mounted on the plate 1. An internal rib 14 on the cover 13 mates with a slot in the closure 10 to prevent undesirable rotation of the chamber. A reduced diameter bottom end 15 of the wall 8 which forms the bottom of the chamber carries a three-armed spider 16 to engage the rim of a glass held below the device. The chamber can be thus pushed upwardly along the tube 2 by the glass when a measured volume of liquid is to be emptied into the glass.

At each of its ends the member 9 is provided with a resilient ring seal 17, 18. The lower seal 17 lies against the exterior of the outflow duct 5 to form a liquid-tight seal for the chamber bottom. The upper seal 18 similarly engages the exterior of the inflow duct 4 when the measuring chamber is in its lower position but as the chamber is moved upwardly and approaches its upper position, the seal moves past the point 6 and onto the reduced diameter portion of the tube whereupon its loses its sealing engagement and vents the chamber to the atmosphere through radial grooves 200 in the plate 1 and clearances between the closure 10 and the cover 13 and between the flange 12 and the wall 8.

Figure 3A:
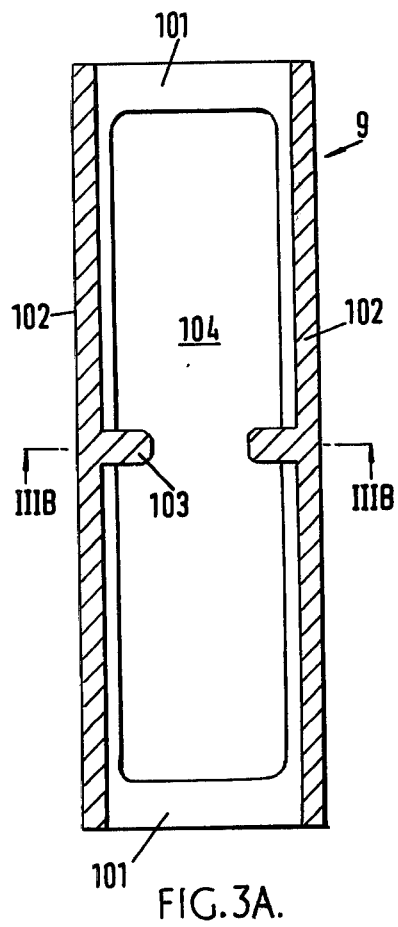
FIGS. 3A and 3B are respectively a vertical section and a horizontal section through a member forming part of the device.
Figure 3B:
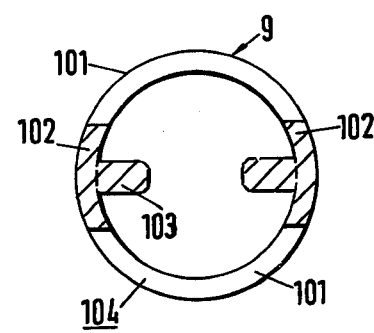

Referring to FIGS. 3A and 3B, the member 9 comprises two circular ring portions 101 interconnected by ribs 102. Each rib is provided, intermediate its ends with a pin 103. Apertures 104 are defined between the ribs.

Figure 4:
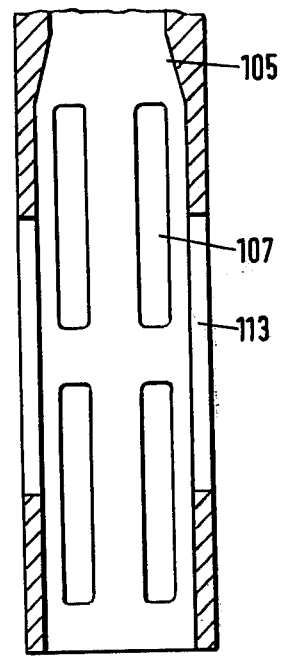
FIG. 4 is a vertical section through a portion of a flow tube forming part of the device.

An upper frustoconical valve seat 105 is formed in the tube adjacent the inflow duct 4 and a lower frustoconical valve seat 106 is formed in the tube adjacent the outflow duct 5. Between the valve seats the tube is formed with slots 113 and with apertures 107 as shown in FIG. 4. (Ends of the apertures 107 are also visible in FIGS. 1 and 2.)

The apertures 104 and 107 provide constant communication between the interior of the intermediate part of the tube i.e. the part of the tube between the valve seats 105 and 106 and the interior of the measuring chamber 7. That is irrespective of whether the measuring chamber is in its upper position, its lower position or any intermediate position the interior of the intermediate part of the tube communicates with the interior of the measuring chamber.

The lower part of the tube forming the outflow duct 5 and providing the valve seat 106 is made separately from the upper part of the tube and is fixed thereto after insertion of a valve assembly, described below, into the upper part of the tube.

The valve assembly comprises two pistons or valve members 108 and 109 carried by a valve carrier 110. Each piston has a head in which is formed an annular radially outwardly facing groove. In each annular groove is located a sealing ring 111 or 112 for providing sealing engagement between the piston and the respective valve seat 105 or 106. Each piston also has a stem extending from the piston head into the carrier. The stem, at its end remote from the piston head, is formed with a flange. The valve carrier moves up and down with the chamber 7 through the pins 103, which extend through the slots 113 in the tube and are engaged in holes in the sidewall of the valve carrier. The pistons are biased apart by a spring 114 accommodated in the carrier. Sliding movement of each piston relative to the valve carrier in the direction away from the other piston is limited by contact between the flange of the piston stem and a corresponding internally directed flange of the valve carrier.

It will be appreciated that the shapes of the valve seats and the pistons are such that when either piston seats on the corresponding seat the piston through its sealing ring, exerts a sealing force on the valve seat, the sealing force having a substantial radially outward component i.e. a component normal to the direction of movement of the piston.

The interior of the chamber plus the free space within the tube between the valve seats 105 and 106 is accurately made so that a prescribed volume of liquid is dispensed during an operating cycle of the device, as described below.

The valve carrier 110 is made of two separate moulded parts which are clipped together, the stems of the valves 108 and 109 have been positioned between them, and meet along a plane, which is a vertical diametral plane in the assembled device.

The ribs 102 of the member 9 are sufficiently flexible that in assembly of the device, they can be bowed outwardly, and the member 9 slid over the tube 2 until the pins 103 enter the slots 113 and the holes in the sidewall of the valve carrier 110.

The operating cycle of the device starts from the FIG. 2 position in which liquid from the bottle has filled the inflow duct 4, the chamber 7, and the free volume of the tube between the valve seats 104 and 105.

As the chamber 7 is slid up the tube 2 by pressure of the rim of a glass against the spider 16, the valve carrier is also raised. The valve 108 becomes seated on the valve seat 105 thereby closing communication between the inflow duct 4 and the chamber 7 and trapping a measured volume of liquid in the chamber and the intermediate part of the tube.

During the upward movement of the chamber, the seal 18 passes the point 6 thereby venting the chamber to the atmosphere. The upward movement continues until the pins 103 reach the upper ends of the slots 113. The chamber is then in its upper position, the valve 108 is seated on the valve seat 105 thereby closing the lower end of the inflow duct 4, and the valve 109 is lifted clear of the valve seat 106 by the carrier 110 thereby allowing the prescribed volume of liquid to flow from the device through the outflow duct 5.

When the glass is removed, the spring 11 presses the chamber downwardly towards its lower position so that the valve 109 reseats on the valve seat 106 and the seal 18 regains sealing contact with the tube. On further downward movement of the chamber to its lower position the valve 108 is unseated from the valve seat. The chamber and the part of the tube between the valve seats then becomes refilled by liquid from the bottle, the displaced air entering the bottle.

I claim:

1. A liquid measuring and dispensing device comprising: a flow tube providing an inflow duct and an outflow duct; an upper valve seat provided at the lower end of the inflow duct; a lower valve seat provided at the upper end of the outflow duct; a measuring chamber axially slidable relative to the flow tube; and a valve carrier connected to the measuring chamber for movement therewith; an upper valve member and a lower valve member carried by the valve carrier; the measuring chamber being movable between an upper and a lower position through an intermediate position; in the lower position of the chamber, the lower valve member seating on the lower valve seat to close communication between the chamber and the upper end of the outflow duct but the upper valve member being unseated from the lower end of the inflow duct to provide communication between the inflow duct and the chamber; in the upper position of the chamber the upper valve member seats on the upper valve seat closing communication between the inflow duct and the chamber but the lower valve member is unseated from the lower valve seat to provide communication between the chamber and the outflow duct; in the intermediate position of the chamber, both valve members seat on the respective valve seats to close communication between the chamber and both the inflow and outflow ducts; and throughout movement of the chamber between its upper and lower positions, the chamber remains in communication with the portion of the flow tube between the valve seats.

2. A device according to claim 1, wherein each valve member exerts a sealing force on the valve seat, the sealing force having a component normal to the direction of movement of the valve member.

3. A device according to claim 2, wherein each valve member and corresponding valve seat are provided with frustoconical sealing surfaces.

4. A device according to claim 1, 2 or 3, wherein the top of the measuring cylinder is vented to the atmosphere when the measuring chamber is moved to its upper position.

* * * * *